United States Patent Office 3,830,714
Patented Aug. 20, 1974

3,830,714
ELECTROCHEMICAL WORKING OF ELECTRICALLY CONDUCTIVE MATERIALS
Jan Zubak, Ostrov, Ctibor Trebichavsky, Nove Mesto nad Vahom, and Jan Augustin, Podolie, Czechoslovakia, assignors to Vyskumny ustav mechanizacie a automatizacie, Nove Mesto nad Vahom, Czechoslovakia
Filed Nov. 18, 1968, Ser. No. 776,713
Int. Cl. B23p 1/00
U.S. Cl. 204—129.6       2 Claims

ABSTRACT OF THE DISCLOSURE

Electrically conductive materials are worked by the electrochemical method by means of a working tool connected to one pole of a source of electric current, whereas the workpiece is connected to the second pole of said source of electric current, the workpiece and working tool facing each other with the surface of the workpiece to be worked and with the active surface of the working tool, with a space left between both surfaces. A medium composed of an electrolyte and of a gas, forming an unstable mixture is forced into the space between workpiece and working tool creating at places to be worked sections with at least two different electric conductivities while proceeding along said place to be worked.

---

Figure 1:
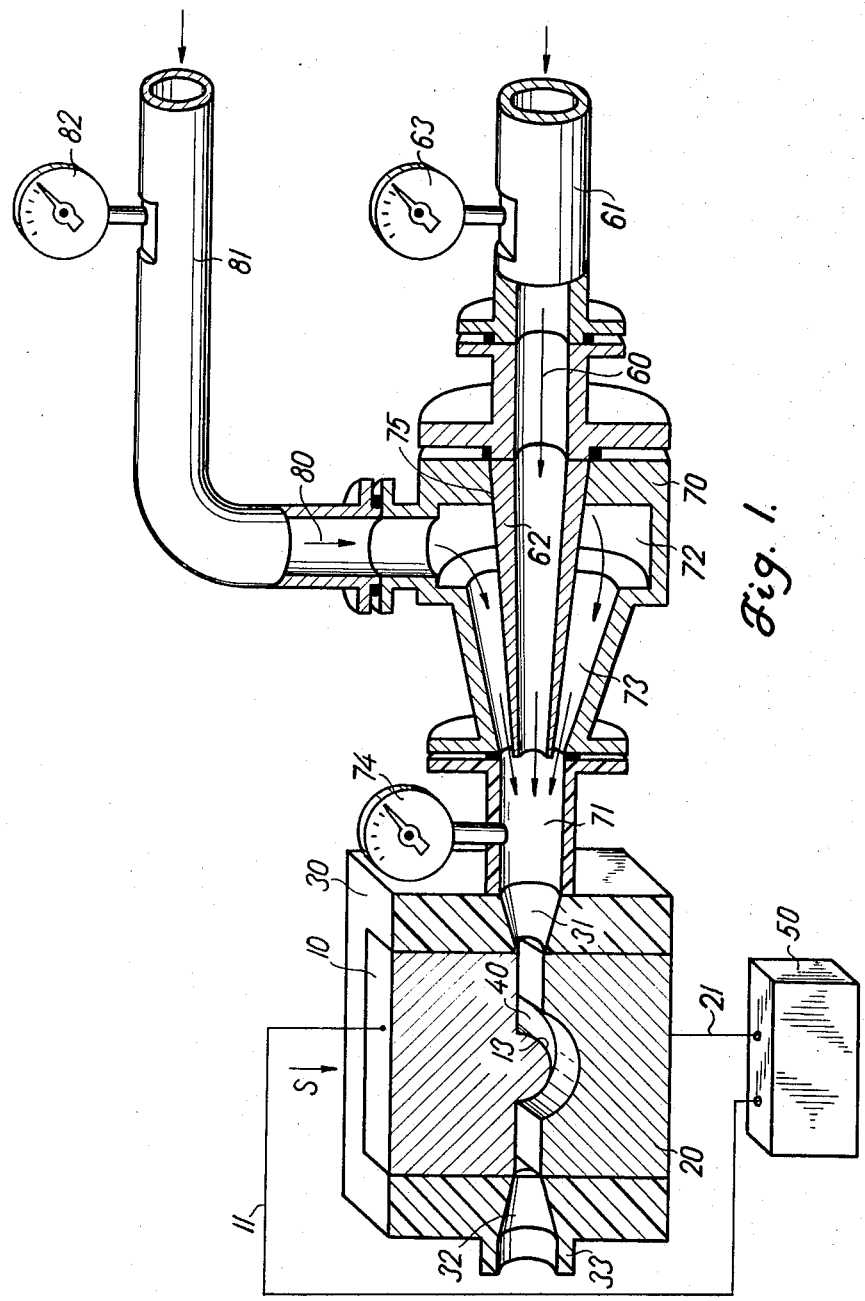

This invention relates to a method of electrochemical working of electrically conductive materials and to an arrangement for executing said method.

Actually known methods of electrochemical working operate generally so that the whole interelectrode space between the working tool and the workpiece is flushed by a stable medium consisting either of an electrolyte or of an electrolyte mixed with or dissolved in some gas. The stable mixture of an electrolyte with gas or their solution is prepared either beyond the working-tool or directly in a hollow working-tool. These mixtures or solutions have within their whole content a constant electric conductivity.

If we consider as the spacing of the interelectrode space the distance between two points on a perpendicular line to the surface of the tool at a given place, whereby one of said points is on the tool, the second corresponding point on the worked surface, then in the course of passage of actually used stable media through the interelectrode space of equal spacing they cause at each place an equally quick anodic dissolution of the workpiece, while the constant electric conductivity is maintained, being determined by the composition and method of preparation of the electrolyte. As the anodic dissolution takes place on the whole worked surface, simultaneously the working process is relatively quick.

In the course of electrochemical working however the working tool or the workpiece is displaced, i.e. their relative position is changed. The speed of their displacement and its direction cooperating with the speed of the anodic dissolution cause a change of the spacing of the interelectrode space, particularly when working surfaces which are not planar. The smallest spacing of the interelectrode space is in direction of change of the relative position of the working tool and of the workpiece, i.e. in the direction of feed and increases gradually with the increase of the angle between said direction and between a perpendicular line to the surface of the working tool at the respective place.

This change of spacing of the interelectrode space particularly causes difficulties for exact working or working of differently shaped objects. If a worked surface of a required exact shape is required, the shape of the working tool has to be corrected when using actual working methods. This correction is however effective only for certain technological conditions for which it has been designed. The correction of working tools is cumbersome and expensive and a correction can be only in a few cases exactly determined by calculation. Therefore it is necessary to determine the final shape of the tool by trials. The necessity of correction of the working tool substantially increases, particularly for complicated shapes, the requirements for an economically justifiable number of workpieces, worked by the electrochemical method. The increased requirement for mass production cannot be in practice frequently satisfied, however, particularly for working of special material of complicated shape which is difficult to work.

Another drawback of actual known methods of electro-chemical working is the necessity of a technological addition on the workpiece. If the interelectrode space has a large spacing, the workpiece is worked also on unwanted places as no working medium is known, which would show a sufficiently low dissipation capability. For such reasons, sharp, unrounded edges on the worked surface can be obtained with great difficulty only.

In addition to these disadvantages of known methods of electrochemical working it should be mentioned that with increased requirements for accuracy of working, requirements for regulating the working process equally increase. Increased requirements call particularly for a constant voltage, constant feeding speed and constant temperature of the electrolyte. It is generally necessary to maintain these values within an accuracy of 2%.

It is an object of this invention to eliminate the major part of drawbacks of known methods and arrangements for electrochemical working. The main feature of the method of electrochemical working of electrically conductive materials according to this invention, where the position of the working tool, connected with one pole of the source of the working current, with respect to the workpiece connected to the second pole of the source of the working current is changed so as to maintain between the working tool and the workpiece an interelectrode space containing a working medium, is that an unstable working mixture of an electrolyte and of a gas passes through the interelectrode space and creates in the space sections of the medium with different electric conductivity, the positions of which sections in the interelectrode space are changing in the course of working and which provide at an equal spacing of the interelectrode space two different speeds of anodic dissolution of the workpiece.

A further feature of the method according to this invention is that in dependence on the pressure of the unstable working mixture of an electrolyte and of a gas, which passes through the interelectrode space, the speed of change of the relative position of the working tool with respect to the workpiece is adjusted so, that for an increase of pressure of the electrolyte and gas in the mixing chamber this speed is reduced and for a pressure reduction in the mixing chamber this speed is increased.

The arrangement for executing the method comprises a working tool connected with one pole of a source of working current separate from the workpiece which is connected to the second pole of the source of working current whereby the relative position of the working tool and of the workpiece is adjustable and in which a hollow conical extension of a supply conduit for the electrolyte is located in a mixer so that it terminates to form a mixing chamber and is joined by way of the inlet opening with the interelectrode space and by way of a conical channel with the expansion space, with a gas conduit which terminates in the expansion space.

The described method and arrangement for electrochemical working according to this invention provides the following advantages:

The shape of the working tool is copied into the workpiece in the course of electrochemical working according to this invention so exactly, that in most cases there is no need of a correction of the tool. The correction is solely reduced to a uniform reduction of the working tool in order to obtain the spacing of the supposed interelectrode space. Due to different speeds of anodic dissolution of the workpiece, said dissolution does not take place on the whole worked surface, in consequence of which the achieved speed of working according to this invention is smaller than the speed achieved with known methods at otherwise like conditions. Finally however the reduction of a working speed is advantageous as the necessity of a correction of the working tool is eliminated, thereby cutting time and expense. This circumstance is noted particularly in production of small series and piece production where particularly for complicated workpieces the time losses and cost of testing, the unit production of a corrected tool and the finishing operations are higher than the saving of time achieved at the proper working. The working according to this invention also eliminates the necessity of a technological addition to the workpiece.

While known methods allow the creation of sharp edges on the worked surface only when using separate working tools, the creation of such edges is according to this invention possible without difficulty with a single tool.

In addition to these advantages and to an increased accuracy of working according to this invention the requirements for a constant feeding speed, voltage and temperature of the electrolyte are relatively lower and in most cases it is sufficient to derive the feeding speed from the pressure of the supplied gas and electrolyte. Fluctuations of the feeding speed have moreover no substantial influence on the quality of the worked surface. The use of a gas surplus in the working mixture is advantageous for the safety of operation since a large gas surplus prevents creation of an explosive mixture with hydrogen, generated in the course of working. If air is used, additional advantageous conditions arise for processes following anodic dissolution such as for instance, oxidation of hydroxides and similar materials.

Figure 2:
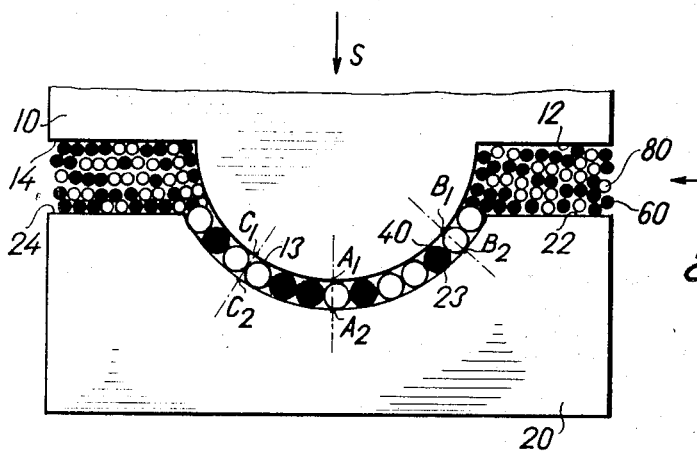
Figure 3:
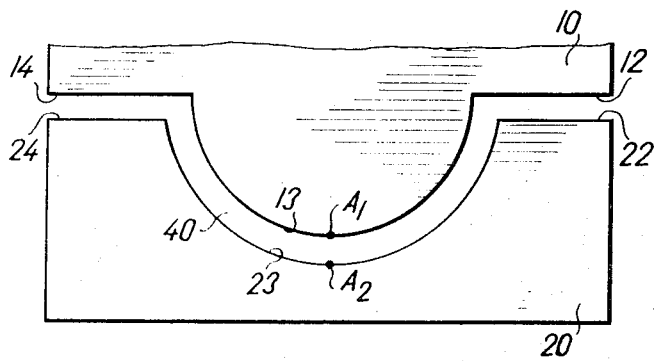
Figure 4:
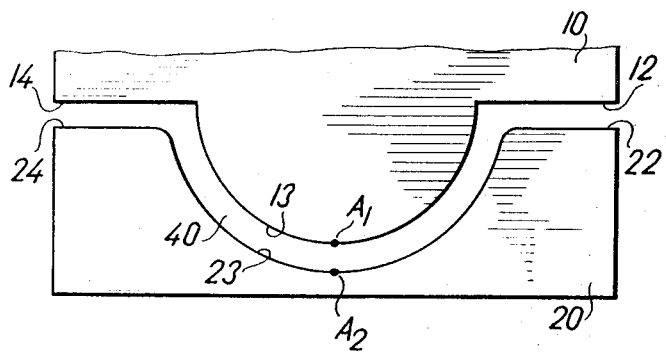
Figure 5:
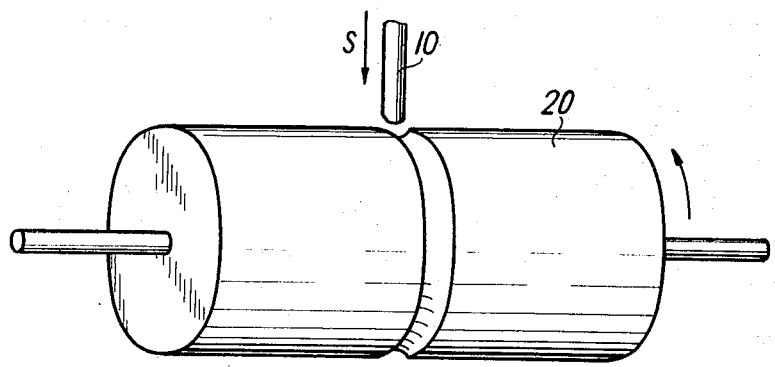
Figure 6:
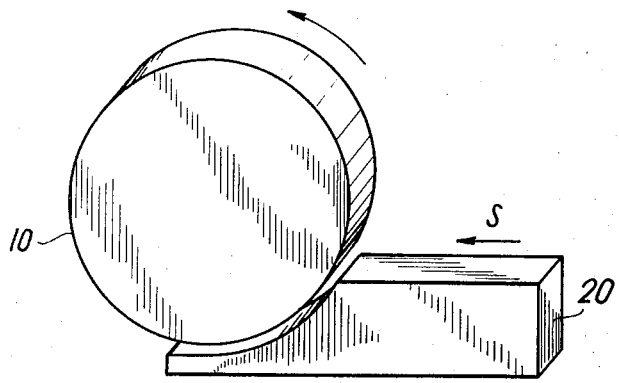

The object of this invention will be explained in the following description which is to be taken with the accompanying drawings where FIG. 1 is a longitudinal sectional view of an arrangement for performing the method according to this invention, FIG. 2 shows a section through an enlarged detail of the working tool and workpiece as used in FIG. 1 and the schematic distribution of the flow of the electrolyte and of the gas between the tool and the workpiece in the course of working according to this invention, FIG. 3 shows a sectional view of an enlarged detail of the working tool and of the workpiece after finishing working according to this invention, FIG. 4 is a sectional view of an enlarged detail of the working tool and of the workpiece after finishing working using actual known methods, FIG. 5 shows schematically a method of working a rotating workpiece with a working tool fed into engagement; and FIG. 6 shows schematically a method of working a workpiece fed in engagement with a rotating working tool.

The principle of the method for electrochemical working according to this invention will be explained according to the exemplary embodiment shown in FIG. 1.

The working tool 10 and the workpiece 20 are located in a working chamber 30 made of electrically nonconductive material so that an interelectrode space 40 is created between them. The working tool 10 is for instance provided with a semicircular extension with the functional surface 13 having the shape which is to be made in the workpiece 20. The arrangement of the workpiece 20 and of the working tool 10 within the working chamber 30 can be different. Either the workpiece 20 is stable and the working tool provided with a packing and having movable in direction S, or the workpiece 20 is movable and the working tool 10 is stable, or both the working tool 10 and the workpiece 20 can be moved. We shall suppose for our exemplary arrangement, that the workpiece 20 is stable and the working tool 10 movable. The working tool 10 is shifted by a device (not shown) in direction 9 so that an interelectrode space 40 is permanently maintained between the working tool 10 and the workpiece 20.

The working tool 10 which can be made of an electrically conductive material or provided on its surface with an electrically conductive layer and is connected by means of a conductor 11 with one pole of a source 50 of working current. The workpiece 20 is connected by means of the conductor 21 with the second pole of the source 50 of working current.

For purposes of explanation the source 50 of working current supplies direct current. In employing direct current, the working tool is connected to the negative pole of the source 50. It is, therefore, a cathode. The workpiece 20 is connected to the positive pole of the source 50. It is therefor, an anode. It is, however, possible to use alternating current as will be explained later.

The voltage of the working current is generally chosen in practice to be within the range of 3 to 50 v.

The electrolyte for example for working of steel can be a 10% aqueous solution of cooking salt NaCl and is supplied under pressure from a not shown storage tank or pumped by way of a supply conduit 61 provided with a hollow conical extension 62 passing through the mixer 70 into the mixing chamber 71. The mixing chamber 71 is connected with the mixer 70 (working tool 10 is solid) or it can be arranged directly within the working tool 10. The pressure of the electrolyte 60 is measured by a manometer 63.

The gas 80 which can be for instance nitrogen, $N_2$ or air is supplied under pressure from a storage tank or pump (not shown) by way of a gas conduit 81 provided with a manometer 82 and flows into the expansion space 72 arranged in the mixer 70, from which it flows through the conical channel 73 of the mixer along the conical extension 62 into the mixing chamber 71. The pressure of gas 80 is lower than the pressure of the electrolyte 60.

The proportion of the volumes of the electrolyte 60 and of the gas 80 supplied into the mixing chamber 71 can be different and may vary within the range between 1:5 to 1:250 (measured at normal conditions).

The electrolyte 60 and the gas 80 are mixed in the mixing chamber 71 to form an unstable working mixture, which is forced over the inlet opening 31 of the working chamber 30 under pressure into the interelectrode space 40. The pressure conditions in the mixing chamber 71 (i.e., the pressure of the working mixture) are measured by a manometer 74. The working mixture which has passed through the interelectrode space 40 leaves through the outlet opening 32 of the working chamber 30 via drain conduit 33 connected to said outlet opening 32.

The conditions in the interelectrode space 40 at a certain moment are shown schematically in FIG. 2.

The working mixture forced under pressure into the interelectrode space 40 in direction of the arrow is composed of the electrolyte 60 (schematically shown as full circles) and of the gas 80 (schematically shown as empty circles) and represents an unstable system. In the course of passage through the interelectrode space 40 the working mixture has a tendency to be separated into drops of electrolyte 60 of the size on the order of about 0.1 mm. to 0.01 mm. and to pure gas.

At places in the interelectrode space 40 of sufficient width, for example between the surfaces 12 and 22 or 14 and 24, the drops of electrolyte 60 are either taken along by the current of gas 80 or are wetting in the form of a film only the surfaces 12 and 14 of the working tool 10 and the surfaces 22 and 24 of the workpiece 20. The electric conductivity of the working mixture is very low in these places (for instance about $10^{-5}$ Ohm$^{-1}$cm.$^{-1}$) consequently the speed of anodic dissolution is practically zero or close to zero so that no working of the surfaces 22 and 24 of the workpiece 20 takes place.

At narrow places of the interelectrode space 40, i.e. between the curved functional surface 13 of the working tool 10 and the worked surface 23 of the workpiece 20, the distance of which is equal to or smaller than the diameter of the drops of electrolyte 60, the drops of electrolyte 60 simultaneously contact both the working tool 10 and the workpiece 20. As the conductivity of the electrolyte is in comparison to the conductivity of the working mixture substantially higher (for instance 0.12 Ohm$^{-1}$ cm.$^{-1}$) an anodic dissolution of the workpiece 20 takes place where the workpiece 20 is connected conductively with the working tool 10 by a drop of electrolyte 60.

The anodic dissolution however does not proceed continuously along the whole worked surface 23. At a certain moment a drop of electrolyte is for instance between points $A_1$, $A_2$ whereby at point $A_2$ on the worked surface 23 of the workpiece 20 an anodic dissolution takes place, the speed of which is determined by the properties of the worked material, by the electrolyte, by the working voltage and by the distance of the functional surface 13 from the worked surface 23.

At the same moment there are for instance between points $B_1$ and $B_2$ or between points $C_1$ and $C_2$ situated at perpendicular lines to the functional surface 13 of the working tool 10 bubbles of gas 80, the conductivity of which with respect to the conductivity of the electrolyte 60 is negligible, the speed of dissolution in points $B_2$ and $C_2$ being therefor zero. Due to the anodic dissolution of the material of the workpiece 20 at point $A_2$, the spacing of the interelectrode space 40 between points $A_1$ and $A_2$ is increased with respect to the adjacent unworked points. As still new working mixture with surplus of gas 80 is forced into the interelectrode space 40, it has a tendency to press drops of electrolyte 60 into the narrowest places of the interelectrode space 40 and the distribution of drops of electrolyte 60 and of gas 80 in the interelectrode space 40 is changed so that gas 80 is present between points $A_1$ and $A_2$ and drops of electrolyte 60 are between points $B_1$ and $B_2$ or $C_1$ and $C_2$. The anodic dissolution of the workpiece at point $A_2$ therefore ceases and starts at points $B_2$ and $C_2$.

The individual points of the worked surface 23 are therefore in the course of working alternately covered by two different media, i.e. by the electrolyte 60 or by gas 80, the position of which changes in the interelectrode space 40. Since the electric conductivity of these media is different (high for the electrolyte 60, minimal for the gas 80), the speed of anodic dissolution at the individual points of the worked surface 23 is also different for a given spacing of the interelectrode space 40 depending whether they are at this moment surrounded by the electrolyte 60 or by the gas 80.

The working tool 10 moves in the course of working in direction S so that a constant distance is maintained between points $A_1$ and $A_2$. The shape of the working tool 10 is thereby subsequently copied into the workpiece 20. The speed of feeding of the working tool is derived from the pressure of the electrolyte 60, from the pressure of gas 80 and from the pressure of the working mixture in the mixing chamber 71, measured for instance by a manometer 74.

The pressure of the electrolyte in the supply conduit 61 and the pressure of the gas 80 in the gas conduit 81 is adjusted prior to starting the working to values which depend on the chosen working conditions and are maintained constant, being measured for instance by manometers 63 and 82. The pressure of the electrolyte 60 is higher than the pressure of gas 80 by at least one atmosphere.

The resulting pressure of the working mixture in the mixing chamber 71, measured for instance by the manometer 74 is for the given spacing of the interelectrode space 40 and for the normal course of working equally constant. In case a change of the spacing of the interelectrode space 40 takes place, this change shows as a change of the pressure of the working mixture in the mixing chamber. The regulation of the feeding speed of the working tool 10 (or the regulation of speed of the change of the relative position of working tool 10 and workpiece 20) in order to maintain a constant spacing in the interelectrode space between the functional surface 13 of the working tool 10 and the worked surface 23 of the workpiece 20, is accomplished so that for an increase of pressure of the working mixture in the mixing chamber 71, the feeding speed of the working tool 10 is reduced and by reduction of pressure in the mixing chamber 71 the feeding speed of the working tool 10 is increased so as to achieve the original pressure of the measuring chamber 71 as indicated by the manometer 74. Good results have been obtained for instance for an overpressure of 5 atmospheres of the liquid and for an overpressure of 3 atmospheres of the gas and for the ratio of volumes between liquid and gas of 1:50. The pressure of the working mixture in the mixing chamber should not exceed the pressure of the gas 80.

The feeding speed can be regulated manually or by a servomechanism (not shown in the drawing). The manometers 63 and 74 shown in the exemplary embodiment can be replaced by measuring devices maintaining the pressure of the electrolyte 60 and gas 80 on chosen values. The manometer 74 can be also replaced by a measuring device controlling a servomechanism for the control of the feeding speed.

The working is finished when the distance between the surfaces 12 and 22 and between surfaces 14 and 24 (FIG. 2) are equal to the spacing of the interelectrode space 40 between points $A_1$ and $A_2$. In that case the spacing of the interelectrode space 40 is at all places equal and an unwanted anodic dissolution of surfaces 22 and 24 would start.

The situation after finishing working is shown in FIG. 3, where the perfect similarity of the shape of the hollowed space in the workpiece 20 with the working tool 10 is the apparent increase of the interelectrode space 40 after finishing working, practically for the distance of points $A_1$ and $A_2$. It is equally obvious from this figure that the meeting place between plane surfaces 22 and 24 and the curved worked surface 23 of the workpiece 20 has the required sharp edges without correction of the working tool 10, the disadvantages of such a correction having been already discussed. The original height of the workpiece 20 (i.e., the distance between the surface 22 or 24 and the bottom surface of the workpiece 20) remained unchanged and no technologic addition of the workpiece 20 was required.

When working with actually known methods, using a stable working material (for instance a pure electrolyte, an electrolyte with a dissolved gas or a stable mist) the shape of the working tool 10 otherwise of the same shape as previously used, is not copied into the workpiece 20 exactly (FIG. 4) but a hollow space of an approximately elliptic shape is formed, with meeting places between the plane surfaces 22 and 24 and the curved surface 23 rounded. This is caused by the circumstance, that stable working media have within their whole content an equal electric conductivity, which prevails at all places of the interelectrode space. Another cause of the difference of the shape of the hollowed place in the workpiece 20 with respect to the shape of the working tool 10 when working according to known methods is the already mentioned influence of the angle of the feeding direction of the working tool 10. The original height of the workpiece 20 is when working with known methods reduced, as are also the surfaces 22 and 24 which have been worked.

When describing the method of electrochemical working according to this invention it has been supposed for easier comprehension that the working tool 10 is connected to the positive pole and the workpiece 20 to the negative pole of the source 50 of direct working current. The same results can be however obtained also if the working tool 10 and the workpiece 20 are connected to a source 50 of alternating working current. In that case the workpiece 20 is with respect to the working tool 10 alternately an anode or cathode.

Within periods where the workpiece 20 is an anode, the working proceeds according to the described method. Within periods where the workpiece is a cathode, cathode reactions proceed thereon (for instance separation of hydrogen, discharge of cations determined by the composition of the material and of the electrolyte). Simultaneously however in case of unsuitable choice of material of the working tool 10 its anodic dissolution could take place in the course of said periods, causing a change of its shape. It is therefore necessary to make the working tool 10 for alternating current working from such a material, which is electrochemically inert at given conditions (for instance if as electrolyte a 10% solution of NaCl is used and hard metal is worked, the tool can be advantageously made of graphite).

As working of the workpiece proceeds, when using alternating current, only if it is an anode, the speed of change of the relative position of the working tool 10 and of the workpiece 20 has to be proportionally reduced.

The alternating current working is advantageous in instance for working of hard metals with a high content of tungsten carbide (WC). If the workpiece 20 is in such a case an anode, tungsten trioxide ($WO_3$) is generated, and it does not dissolve in the given electrolyte. At the following moment when the polarity of the electrodes is changing, i.e. the workpiece 20 becomes a cathode, the sodium ions striking the cathode dissolve the layer of tungsten trioxide covering the worked surface 23 of the workpiece 20 and converts the trioxide to disodium monotungstate ($Na_2WO_4$) enabling a further anodic dissolution of the workpiece 20 proceeding at the repeated change of polarity.

The described method of electrochemical working of electrically conductive materials according to the object of this invention can be also applied if the workpiece 20 rotates around its axis and the working tool is fed towards the workpiece (FIG. 5), or if the working tool has the shape of a disk rotating around its axis and the workpiece 20 is fed towards the tool (FIG. 6).

The arrangement for executing the described method of electrochemical working according to this invention (FIG. 1) comprises a working tool 10 and an electrically conductive workpiece 20 located in working chamber 30 and separated therein by an interelectrode space 40 containing a working mixture, the workpiece 20 and the working tool 10 connected to a source 50 of working current. It comprises furthermore a supply conduit 61 for the electrolyte 60, a mixer 70 and a gas conduit 81 for the supply of gas 80. The working tool 10 has for instance on its lower surface an extension of semicircular shape with a functional surface 13, which should create a hollow in the workpiece 20.

The working tool 10 and the workpiece 20 can be arranged in the working chamber made of electrically not conductive material in a different manner. Either the working tool 10 is provided with a packing and is movable in direction S and the workpiece 20 is stable, or the working tool 10 is stable and the workpiece 20 is movable, or both the working tool 10 and the workpiece 20 are movable. An interelectrode space 40 is created between the working tool 10 and the workpiece 20 terminating on one side into the inlet opening 31 of the working chamber 30, on the other side into the outlet opening 32 of the working chamber 30 connected to a drainage conduit 33. The working tool 10 is connected through the conductor 11 with one pole of the source 50 of working current, the workpiece 20 is connected through the conductor 21 with the other pole of the source 50 of working current. The working tool 10 and the workpiece 20 are therefore both electrodes. When using direct current the working tool 10 is connected with the negative pole of the source 50 of working current, i.e. it is a cathode; the workpiece 20 is connected with the positive pole of the source 50 of working current i.e. it is an anode. If a source 50 of alternating working current is used the workpiece 20 is alternately an anode or cathode.

The supply conduit 61 for the supply of the electrolyte 60 from a not shown storage tank or pump is provided with a hollow conical extension 62 and with a manometer 63. The hollow conical extension 62 which is inserted into a conical seat 75 of the mixer 70 passes freely through the expansion space 72 and through the conical channel 73 of the mixer 70 so as to terminate into the mixing chamber 71 which is connected with the inlet opening 31 of the working chamber 30. The gas conduit 81 for the supply of gas 80 from a storage tank or pump (not shown on the drawing) is provided with a manometer 82 and terminates into the expansion chamber 72 of the mixer 70, connected by the conical channel 73 with the mixing chamber 71. The mixing chamber 71 is provided with a manometer 74 for measuring of pressure of the working mixture. The drain conduit 33, by means of which the used working mixture is drained from the interelectrode space 40, can be connected with a not shown storage tank of the electrolyte 60.

The working tool 10 is either completely made of electrically conductive material, or it is on its surface provided with an electrically conductive layer. When using direct current, the working tool is advantageously made of copper (suitable for working of steel), when using alternating current, it is suitable to make it of graphite (suitable for working of hard metals).

The feeding of the working tool 10 (or the feeding of the workpiece 20 or both of the working tool 10 and of the workpiece 20) in the working chamber 30 is achieved by a not shown feeding device, controlled either manually or automatically. The feeding conditions are derived from the pressure of the working mixture in the mixing chamber 71, measured for instance by the manometer 74.

The operation of the arrangement has been already described in connection with the description of the method of electrochemical working of electrically conductive materials according to this invention.

We claim:

1. A method for electrochemical working of electrically conductive materials comprising the steps of spacing a workpiece connected to one pole of a source of electric current a distance from a working tool having a contoured surface for obtaining the proper shape of said workpiece connected to the second pole of said source of electric current, moving said work tool and said workpiece relative to each other and forming an interelectrode space between the contour surface of said work tool and the surface of said workpiece having at one portion thereof a smaller distance than the rest, said smaller distance being juxtaposed along a perpendicular line to the workpiece requiring the greatest working, introducing a flow of electrolyte under pressure to said interelectrode space, withdrawing said electrolyte at a point remote from its introduction to cause a flow of electrolyte therethrough, mixing a gas under a pressure lower than said electrolyte with said electrolyte prior to its introduction into said interelectorde space to form an unstable mixture of gas and electrolyte droplets therein which produces in the portions of said interelectrode space having a small distance a discontinuous stream of electrolyte with respect to gas, maintaining said small distance equal to or less than the diameter of said electrolyte droplets to produce a first conductivity and rate of anodic dissolution corresponding to the existance of electrolyte and a second conductivity and rate of anodic dissolution less than said first conductivity and rate of dissolution corresponding to the presence of gas thereby shaping said workpiece under different rates a dissolution into the shape of said tool.

2. The method according to claim 1 including the step of moving said work tool in relation to the anodic dissolution of said workpiece, measuring the combined pressure of said electrolyte and gas in said mixture prior to the introduction into said interelectrode space and controlling the speed of movement of said work tool in response to changes in the pressure of said mixture to maintain said interelectrode space at a constant distance.

References Cited
UNITED STATES PATENTS

| | | | |
|---|---|---|---|
| 3,271,283 | 9/1966 | Clifford et al. | 204—143 M |
| 3,338,807 | 8/1967 | Clifford | 204—143 M |
| 3,357,906 | 12/1967 | Jollis et al. | 204—143 M |
| 3,284,327 | 11/1966 | Maeda et al. | 204—277 |
| 3,378,473 | 4/1968 | Inone | 204—277 |

PATRICK P. GARVIN, Primary Examiner

I. VAUGHN, Assistant Examiner

U.S. Cl. X.R.

204—129.5